United States Patent [19]

Norrell et al.

[11] 4,366,509

[45] Dec. 28, 1982

[54] FACSIMILE APPARATUS WITH MULTIPLE SCANNING AND PRINTING ELEMENTS

[75] Inventors: Donald L. Norrell, Woodbury; Kurt H. Petersen; Ronald F. Schmid, both of White Bear Township, Ramsey County, all of Minn.

[73] Assignee: Minnesota Mining and Manufacturing Co., Saint Paul, Minn.

[21] Appl. No.: 249,881

[22] Filed: Apr. 1, 1981

[51] Int. Cl.³ .......................... H04N 1/18; H04N 1/40
[52] U.S. Cl. .................................... 358/289; 358/280; 358/286
[58] Field of Search ................ 358/289, 286, 280, 256

[56] References Cited

U.S. PATENT DOCUMENTS

1,751,584  3/1930  Hansell .............................. 358/281
4,203,136  5/1980  Wellendorf ........................ 358/280

Primary Examiner—Howard Britton
Attorney, Agent, or Firm—Cruzan Alexander; Donald M. Sell; Robert L. Marben

[57] ABSTRACT

A drum-type transceiver facsimile machine having a plurality of light-to-electric transducers and a plurality of printing styli moved axially of the drum for scan/print operation. Shift register means and a buffer memory controlled by a programmed microprocessor provide for multiplexing of signals from the transducers having a scan operation and demultiplexing of signals during the print mode with use of a buffer memory permitting compression of the multiplexed signals and decompression of received signals prior to demultiplexing.

5 Claims, 12 Drawing Figures

FACSIMILE APPARATUS WITH MULTIPLE SCANNING AND PRINTING ELEMENTS

BACKGROUND OF THE INVENTION

This invention relates to a drum-type facsimile machine capable of transmitting and receiving and in particular to such a machine wherein a plurality of scanning and printing elements are used.

A drum-type facsimile transceiver typically uses a single light-to-electrical transducer provided at a scanning head for use in the transmission mode to scan an image bearing document secured to a rotating drum. The document is scanned when the scanning head is moved axially of the drum by a subscan motor drive as the drum is rotated. The output of the transducer provides data in the form of a continuous serial representation of the light reflected in accordance with the density of the image presented as the document is scanned. The signal from the transducer is digitized or it is used in its analog form. This signal is placed in a suitable form for transmission over a suitable transmission link, such as a telephone line, to another facsimile transceiver having copy paper secured to the drum of the machine. The position and speed of the rotation of the drum at the receiving machine is synchronized with the drum at the transmitting machine. The facsimile transceiver typically has a printer in the form of a single stylus positioned on the scanning head which, when the transceiver is receiving, is positioned in contact with copy paper carried by the drum. As in the case of the transmitting mode, the scanning head is moved axially of the rotating drum at a rate which provides a generally helical scan similar to the scan path provided by movement of the scanning head with rotation of the drum at the transmitting machine. A voltage is applied to the stylus in accordance with the signal received from the transmitting machine causing a reaction at the copy paper surface to produce a representation on the copy paper of the image bearing document scanned at the transmitting machine.

The speed of transmission of such a facsimile machine is limited in part by the transmission characteristics of the transmission link. Various data compression/decompression techniques are known which permit transmission of data over a transmission link at a higher rate. Any increase in the speed of transmission of data sought by an increase in the drum rotation speed of the typical drum/type facsimile machine creates scan and print rate problems as well as vibration and noise problems limiting the increase in copy transmission speed that can be attained by such an approach.

SUMMARY OF THE INVENTION

The invention is embodied in a transceiver facsimile machine of the drum-type operable in a scan mode or print mode wherein the drum is rotatable while a scan-print head is moved axially of the drum to provide a scan action when in the scan mode and a print action when in the print mode and includes a plurality of shift register means operable for providing serial/parallel operation for a scan mode of operation and operable for providing parallel/serial operation for a print mode of operation. A plurality of printing styli carried by the scan/print head is provided, each operatively connected to a different one of the shift register means for receiving serial data signals from the shift register means during the print mode. In addition a scanning means including a plurality of light-to-electric transducers carried by the scan/print head is provided, each operatively connected to a separate shift register means for serial entry of data signals into such shift register means during the scan mode. A buffer memory is operatively connected to the shift register means provided for a scan operation to receive data signals from the shift register means in parallel during a scan mode of operation. During the print mode the buffer memory receives serial data signals and provides data signals in parallel to the shift register means used in the print mode. A memory for storing programs for a microprocessor is provided with the microprocessor operatively connected to the memory, the shift register means, and the buffer memory for operatively controlling movement of data signals from the shift register means into said buffer memory during a scan mode and operatively controlling movement of data signals into the buffer memory and out of the buffer memory to the plurality of shift register means during a print mode of operation.

This invention permits a plurality of scan lines of data signals to be simultaneously produced which are stored in the buffer memory for each scanning revolution of the drum during a scan mode of operation and for each printing revolution of the drum provides for the simultaneous printing of a plurality of lines per data signals provided from the buffer memory to the plurality of printing styli during a print mode of operation.

The foregoing arrangement not only provides for the multiplexing of signals during the scan mode and demultiplexing of signals during the print mode to speed up the scan and printing process, but also provides for the buffer memory mentioned which permits compression of the data signals during the scan mode and decompression of the data signals during the print mode.

Another feature of the present invention resides in the use of staggered printing styli allowing a plurality of styli to be used to provide good printing resolution with adequate electrical isolation provided between the styli. In order that the printing styli can be staggered, the receive portion of the transceiver includes a delay means for each styli that is positioned from other styli in the direction of rotation of the drum to delay the application of a data signal to such styli.

A facsimile transceiver apparatus using the multiple light-to-electric transducers and printing styli in the manner described requires a short time for copy transmission as compared to that required for facsimile transceivers using a single printing stylus and a single light-to-electric transducer.

BRIEF DESCRIPTION OF THE DRAWINGS

In the drawings, which form an integral part of the written description and are to be considered in conjunction therewith, and in which like parts are designated by identical reference numerals in the various figures.

DETAILED DESCRIPTION

Figure 1:
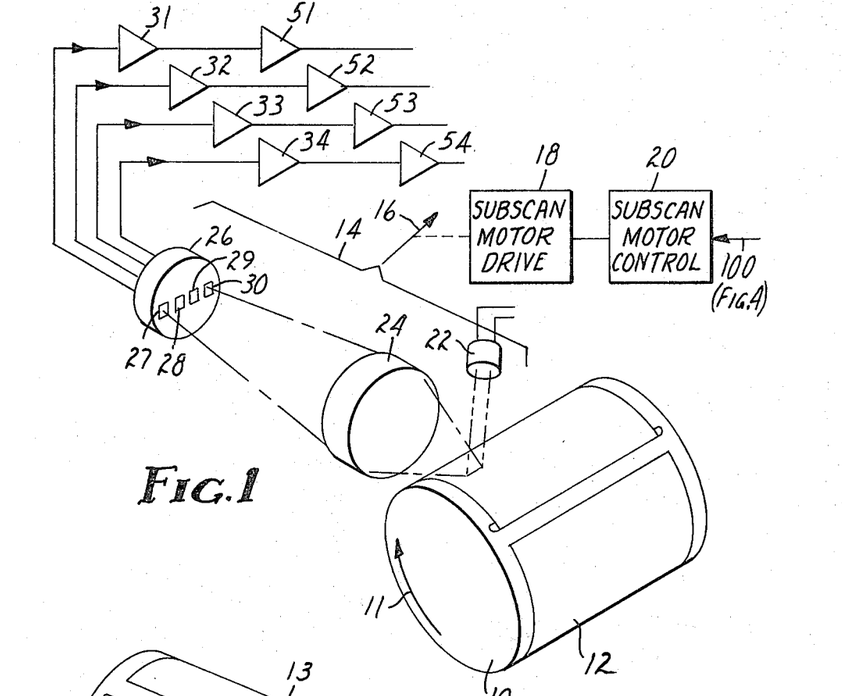
FIG. 1 is partial schematic showing of a drum-type facsimile machine with which the present invention is used wherein the elements of the scan head and some associated circuitry for use in the scan (transmit) mode are shown.

Referring to FIG. 1, a drum-type transceiver facsimile machine is shown to the extent needed for disclosure of the present invention with respect to the scanning of an image bearing document 12 when the machine is in the scan or transmit mode. Drum-type facsimile machines are well known, so full details of the structure used to move the scan head axially of the drum while the drum is rotated are not shown in the drawings. The scanning action provided by rotation of the drum relative to the scan head in this type of machine is referred to as the main scan while the scanning action due to movement of the scan head axially of the drum is referred as the subscan. The image bearing sheet 12 is generally secured to the drum 10 at one edge portion. The drum is rotated at a predetermined speed by a motor drive (not shown). The direction of rotation is indicated by the arrow 11. While the drum is rotating, the scan head, indicated generally at 14, is moved axially of the drum from one end of the drum to the other by a subscan motor drive 18 under the control of a subscan motor control 20. Scanning movement of the scan head is shown by the arrow 16. The scan head 14 of this invention includes means for directing light to the image bearing sheet 12 and producing a plurality of electrical signals, each signal being proportioned to reflected light from adjacent scanned areas of the image bearing sheet. Such means includes a light source 22, a lens assembly 24 and a multiple light-to-electric transducer assembly 26. The transducer assembly 26 has multiple light-to-electric transducer elements which are equally spaced and arranged in a linear array that extends in a direction parallel to the axis of the drum 10. For the scan or transmit mode, the light source 22 on the scan head 14 directs light toward the drum 10 with the lens assembly 24 designed and positioned to receive light reflected from the image bearing sheet 12 on the drum so that light from multiple adjacent locations, corresponding to the number of transducer elements at the transducer assembly 26, is focused on the transducer elements. For purposes of illustration, four transducer elements 27-30 are used at the transducer assembly 26. The four transducer elements 27-30 can be four photodetectors which are operated in the current mode. Accordingly, with the drum rotating, the transducer element 27 will provide a continuous analog output signal indicative of the intensity of the light reflected from the image bearing sheet 12 as the drum rotates. The remaining transducer elements 28-30 operate in a similar fashion so that four simultaneous output signals are produced by the sensor assembly 26. A digitizing circuit means, one for each of the transducer elements 28-30 is provided for digitizing the output signals from a transducer element. Each such circuit means includes a video amplifier and a comparator. Thus, four video amplifiers 31-34 are provided for amplification of the signals from transducers 27-30, respectively. Video amplifiers under the type designation LM 347 can be used and are operated in the current to voltage converter mode. The output of the video amplifiers 31-34 are applied to comparators 51-54, respectively. Comparators under the type designation LM 311 can be used. A comparator provides a logic "0" when the output of the comparator is in excess of a selected level and provides a logic "1" when the output of the comparator is less than such selected level. Logic "0" corresponds to white areas of the image bearing document 12, while logic "1" that is scanned corresponds to black areas of the image bearing document. The scan head 14 is moved axially of the drum as the drum rotates so a generally helical scan is provided. The subscan motor control 20 and subscan motor drive 18 are arranged to move the scan head 14 a distance for each scan revolution that is equal to the number of transducers used at the transducer assembly 26 times the distance between the centers of two adjacent transducers divided by the magnification ratio of the lens assembly 24. A scan revolution is a revolution of the drum during which the output of the transducer elements 27-30 is utilized. Such movement provides a full scan of the image bearing sheet 12 without any portion of the sheet being omitted or subjected to a scan revolution more than once.

Figures 2, 3:
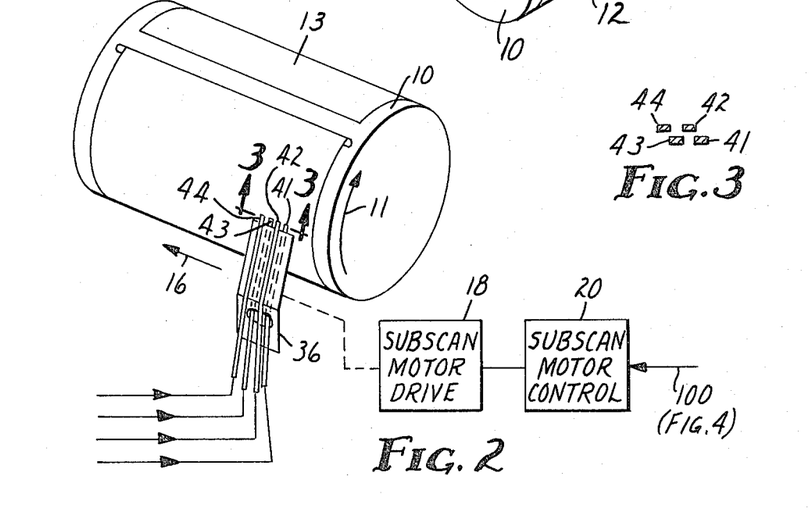
FIG. 2 is another partial schematic showing of a drum-type facsimile machine with which the present invention is used wherein the elements of the scan head for use in the print (receive) mode are shown.
FIG. 3 is a transverse cross-section view of the printing stylus array of FIG. 2, along the line 3—3.

Referring to FIG. 2, the drum-type facsimile machine of FIG. 1 is shown for operation in the receive (print) mode. A multiple printing stylus assembly 36 which is carried by the scan head 14 for operation during the receiving (print) mode is shown. As in FIG. 1 the printing stylus assembly 36 is moved axially of the drum 10 as indicated by the arrow 16, while the drum rotates in the direction indicated by the arrow 11. The subscan motor control 20 and the subscan motor drive 18 are arranged to move the stylus assembly 36 a distance for each printing revolution that is equal to four times the axial distance between adjacent styli of the stylus assembly 36. A print revolution is a revolution of the drum during which signals are applied to the stylus assembly. Like the image bearing document 12 of FIG. 1, a copy sheet 13 is carried on the drum 10 and is contacted by each stylus of the stylus assembly 36. A stylus is provided for each light-to-electric transducer used during the transmit mode. Thus, four styli 41-44 are used which are positioned relative to one another as shown in FIG. 3. FIG. 3 is a transverse cross-section view of the styli taken along line 3—3 of FIG. 2. As shown in FIG. 3, the four styli 41-44 are arranged in two rows of two each and are spaced so the stylus 43 of the lower row is directly below and centered with respect to the space separating the styli 42 and 44 of the upper row with the spacing between the styli 41 and 43 of the lower row being the same as the spacing between styli 42 and 44. Such spacing is used to minimize the problem of providing electrical isolation between the styli. The dimension, in the axial direction of the drum 10, of each styli corresponds to the scan line width covered by one of the transducers 27-30 of FIG. 1 in the scan direction. The full width covered by the styli 41-44 in the direction of the axis of the drum corresponds to the scan width covered by the four transducers 27-30 used in the transmission mode. The width of each styli 41-44 in the direction of rotation of the drum is about the same as the smallest copy resolution to be obtained in that direction. Viewing FIG. 3, it is apparent that a position on the copy sheet 13 defined by a line parallel to the axis of the drum at the outer surface of the copy sheet is presented to the styli 42 and 44 a short time after such line is presented to the styli 41 and 43. This gives rise to the need for time compensation with respect to signals to be The buffer memory 56 is a memory having one section 56d for storing decompressed (uncompressed) data and another section 56c for storing compressed data. The decompressed data section has a capacity for storing a number of data bits that is far in excess of the bits obtained from each scan revolution of the drum 10. In the case of the use of four light-to-electric transducers 27–30, a memory having a capacity that is 32 times the bits obtained from the signal provided from one of the transducers for one scan revolution of the drum has been found to be more than adequate. A random access memory can be used for the buffer memory 56. For purposes of this description, the bits that are obtained from the signals from any one of the transducers 27–30 for one revolution of the drum 10 will be referred to as a bit line. In the case of the example given above for the CCITT Group III standard, a bit line has 1728 bits or 216 bytes, each byte consisting of 8 bits. The memory is organized so the 8 bit bytes from which the bit lines are formed are effectively in a circular arrangement with no fixed beginning and no fixed end. As is well known in the operation of memories, a beginning of data pointer (BOD) and an end of data pointer (EOD) are used. The BOD points to the byte last entered in the memory while the EOD points to the oldest byte present in the memory. For purposes of this description the designation dBOD and dEOD are used in connection with the pointers for the bytes in the decompressed data section of the buffer 56 with a cBOD and cEOD used in connection with the pointers for the bytes in the compressed data section of the buffer 56.

The address pointers are, for instance, held in fixed locations to allow the program stored in the read only memory 58 to locate the resident data in the buffer memory 56. dBOD and dEOM are used to designate the address of the first and last memory bytes, respectively, which have been stored in the decompressed data section of the buffer, while cBOM and cEOM are used to designate the address of the first and last memory bytes, respectively, in the compressed data section of the buffer.

Figure 5:
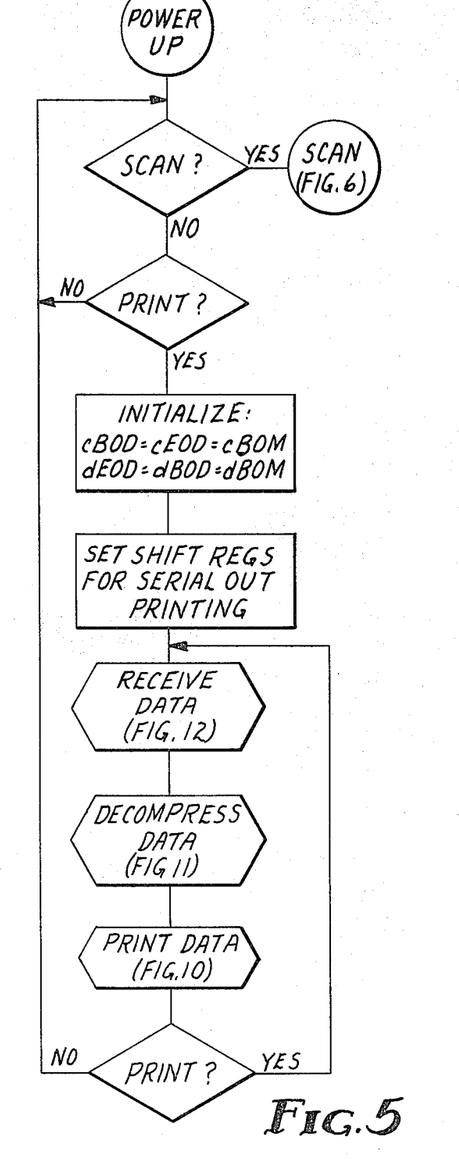
FIGS. 5-12 are flow diagrams relative to the operation of the facsimile machine of FIGS. 1 and 2 and the circuitry of FIG. 4 when operated in the scan mode and in the print mode.
Figure 6:
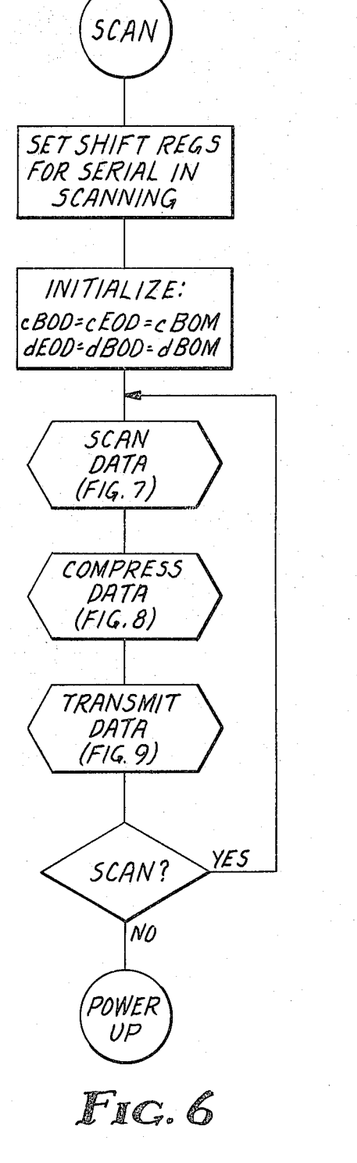
Figure 8:
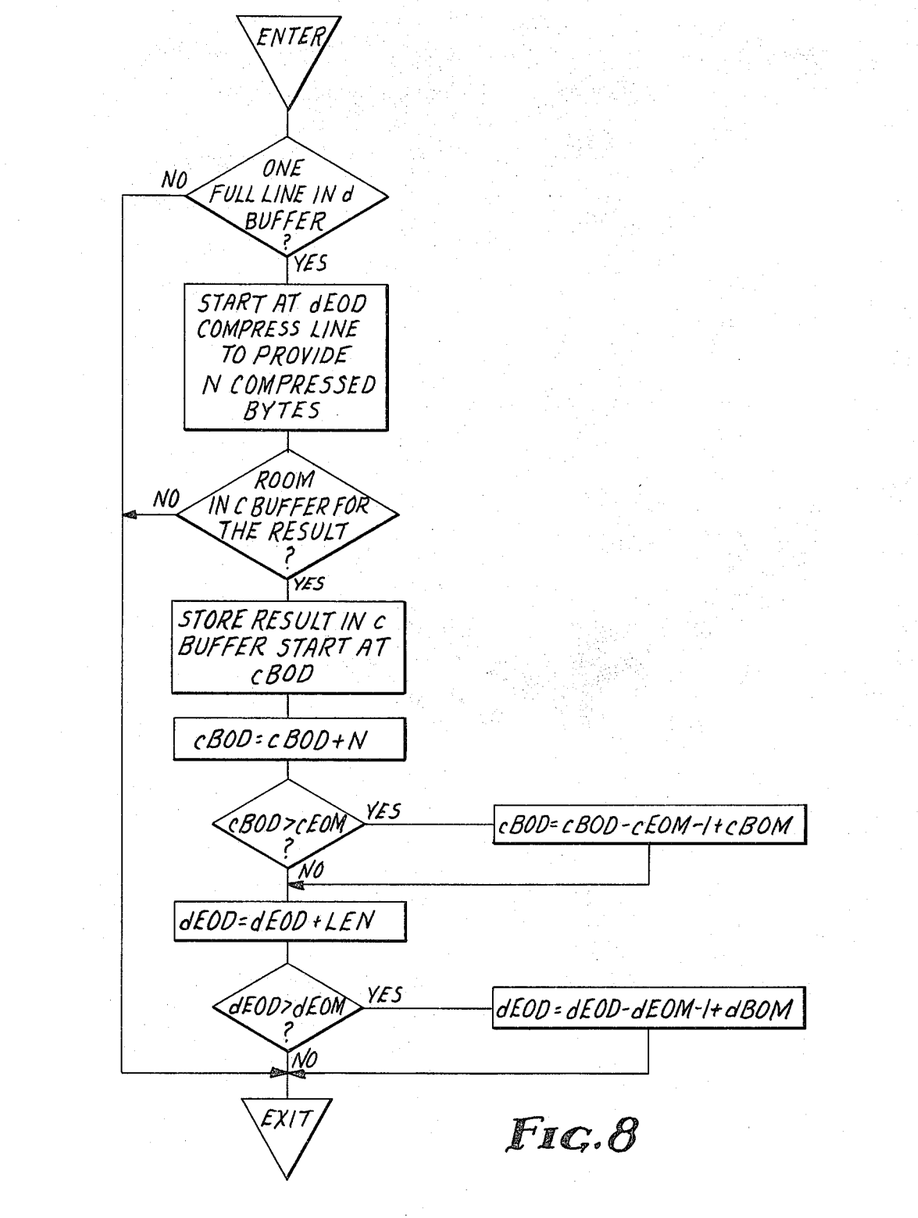
Figure 9:
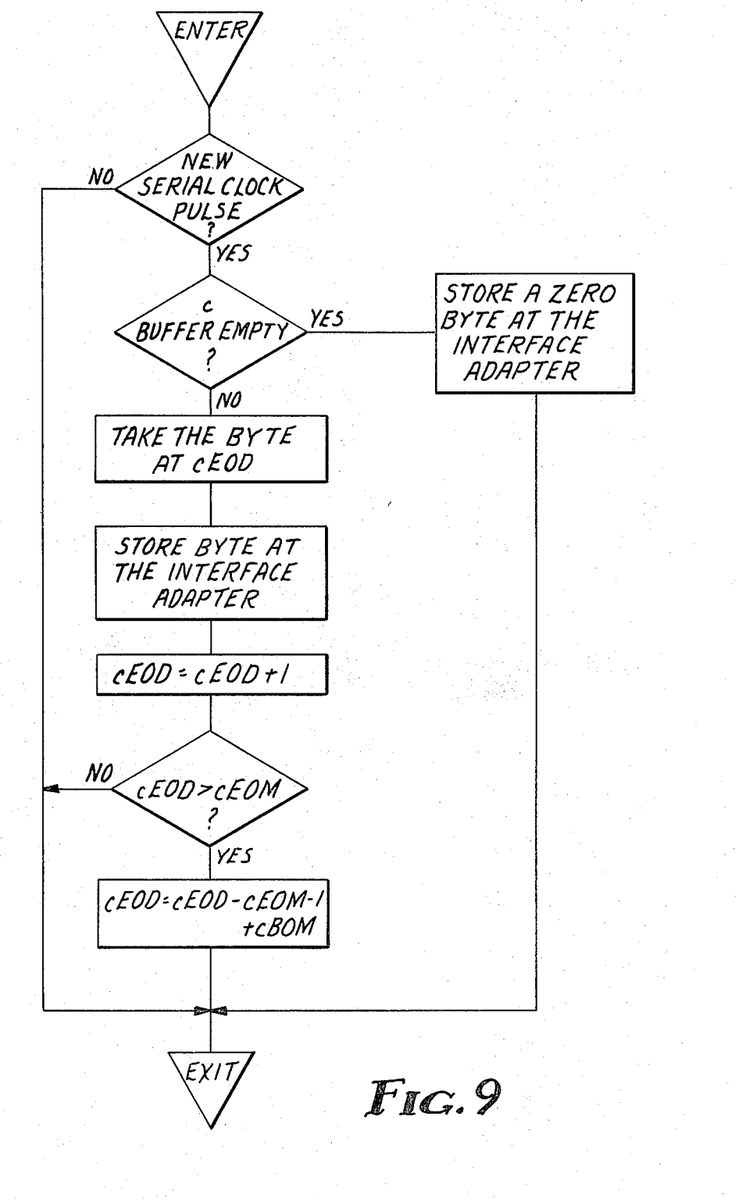
Figure 11:
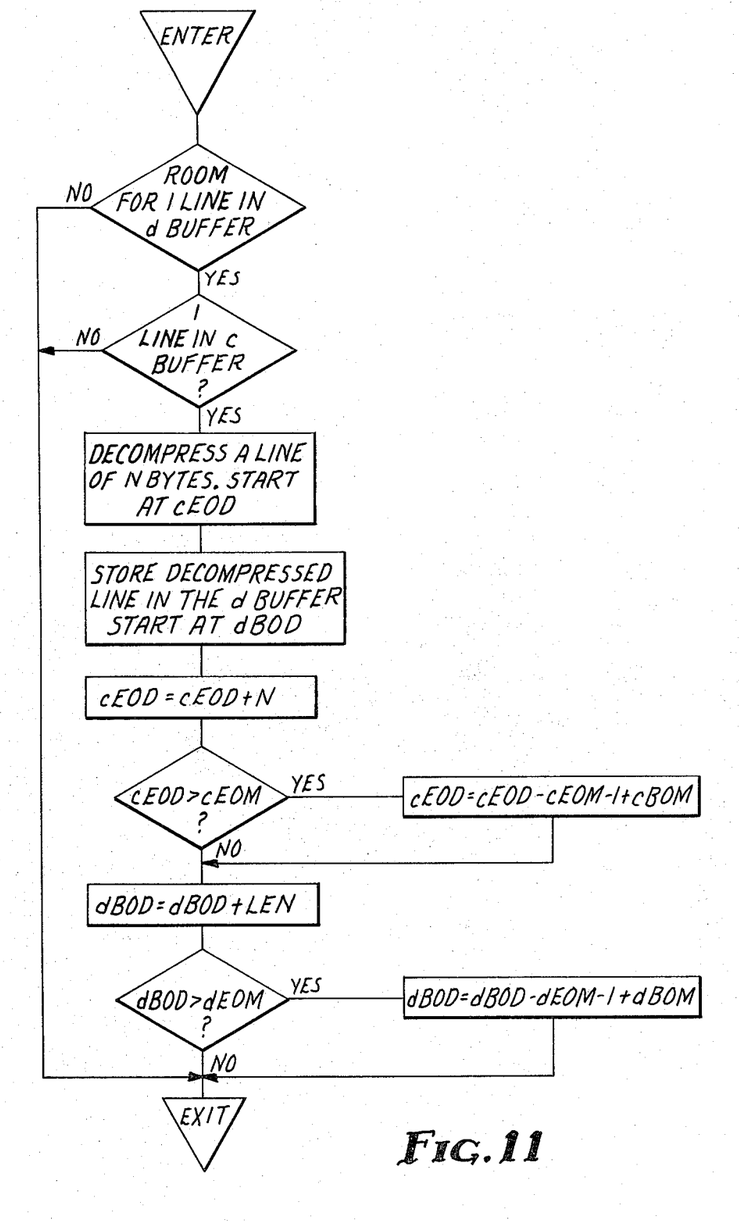
Figure 12:
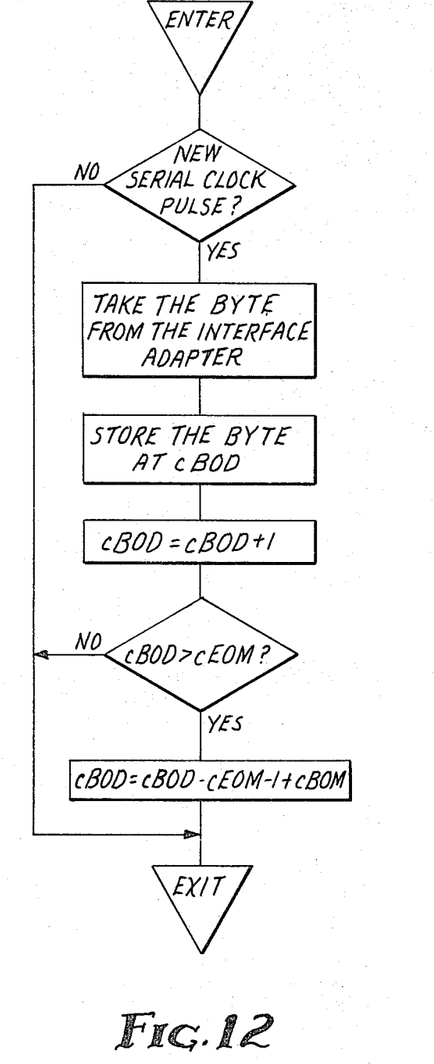

The read only memory 58 stores the various programs needed for use by the microprocessor 65 for controlling the various operations performed by the circuitry for processing data generated in parallel for passage in serial form to the machine modem for the scan (transmit) mode and for processing data received in serial form from the modem for the machine for passage to the printing styli in parallel form during the print (receive) mode. The read only memory connections to the control bus 95, the address bus 105 and the data bus 115 are represented by conductors 126, 127, and 128, respectively. Flow charts for the various programs used are set forth in FIGS. 5–12, which should be referred to in conjunction with the description given regarding the various programs. The designation LEN appearing in the flow charts is a short way of writing "line length of a decompressed line". "N" and "1" as used in the equations appearing in the flow charts refers to a number of bytes or 1 byte, respectively. The programs include a main data control program (FIGS. 5 and 6) scan data program (FIG. 7), compress data program (FIG. 8), transmit data program (FIG. 9), print data program (FIG. 10), decompress data program (FIG. 11), and receive data program (FIG. 12).

Before considering the operation of the circuitry in conjunction with the programs provided in the read only memory for the microprocessor 65, a brief description will be given of the various programs.

Upon the application of a power up signal via conductor 25 to the microprocessor 65, the main data control program (FIGS. 5–6) monitors the status of the print 80 and scan 50 input lines to the interface adapter 60. When either of these two lines becomes active, control is transferred from the main data control program to the appropriate group of program subroutines. If the scan input 50 is active, control is given to the scan data (FIG. 7), compress data (FIG. 8), and transmit data (FIG. 9) program routines. If the print input 80 is active, control is given to the receive data (FIG. 12), decompress data (FIG. 11) and print data (FIG. 10) program routines.

The scan data program routine (FIG. 7) provides for the removal of data from the four shift registers 61–64, which are set for serial/parallel operation, and placement of such data in the decompressed data section of the buffer memory. If there is no room in the buffer memory, the subscan is stopped and the routine waits for at least one more line start pulse before trying to load the buffer. Once there is room in the decompressed data section of the buffer memory, the subscan is started and data is again entered into the buffer. If any pointer is incremented past the end of memory, it is set to beginning of memory.

The compress data program routine (FIG. 8) provides for the removal of lines of data from the decompressed data section of the buffer and their translation into compressed lines which are entered in the compressed data section of the buffer memory 56. Compression is according to tables held in a read only memory which can be memory 58. These tables can be those based on CCITT information available to facsimile manufacturers. The compressed line lengths are data dependent.

The transmit data program routine (FIG. 9) provides for the removal of data from the compressed data section of the buffer memory and its presentment to the interface adapter 60 upon the demand of a serial clock pulse provided on conductor 70 from the machine modem logic (not shown).

The receive data program routine (FIG. 12) serves to obtain data from the interface adapter 60 and place it into the compressed data section of the buffer memory in response to a serial clock pulse provided at conductor 70 from the machine modem logic (not shown).

The decompress data program routine (FIG. 11) does the opposite of the compress data program routine. It removes compressed data from the compressed data section of the buffer memory, and after it is decompressed (decoded) to provide data of fixed length lines, enters the data in the decompressed section of the buffer memory. The decompression scheme is the reverse of the compression scheme. Decompression is according to tables held in a read only memory which can be memory 58. The tables can be those based on CCITT information available to facsimile manufacturers.

The print data program routine (FIG. 10) provides for the removal of data from the decompressed data section of the buffer memory. The data is removed a byte at a time from four different stored lines and is transferred to the four shift registers 61–64 which are set for parallel/serial operation. Data is only removed when there is at least four lines stored in the decompressed data section of the buffer memory. If four lines are not present, the subscan is stopped until four lines applied to the upper row (42,44) of the styli which will be discussed later in this description.

In order to minimize transmission costs it is desirable that the parallel or multi-channel output provided from the transducer assembly 26 of the transmitting facsimile machine be multiplexed at the machine to place the information to be transmitted to the receiving machine in serial form where a demultiplexing action is provided so a parallel or multi-channel serial input can be provided to the styli assembly 36 of the receiving facsimile machine. One important aspect of the present invention is that the multiplexing-demultiplexing is accomplished in a manner that allows the data to be readily compressed and decompressed which in addition to the multiplexing and demultiplexing serves to further reduce transmission costs.

Figure 4:
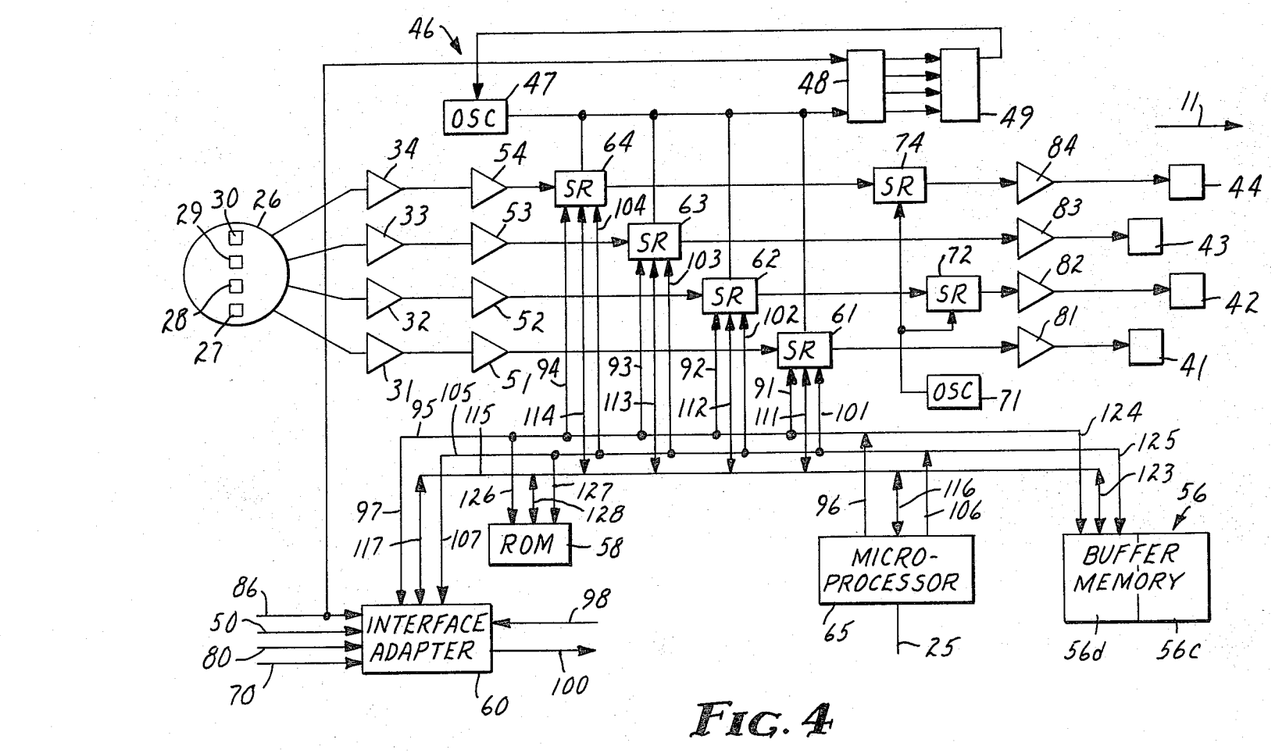
FIG. 4 is a block diagram of the circuitry used with the drum-type facsimile machines of FIGS. 1 and 2 for use in the print and scan mode of operation.

FIG. 4 shows circuitry of the present invention which provides the desired multiplexing and demultiplexing. The multiplexing action provides for the conversion of the simultaneously produced multi-channel serial digitized signal information provided by the drum-type facsimile scanning operation described in connection with FIG. 1 into a single channel, serial digital output. The demultiplexing provides for the conversion of a single channel, serial digital input to multi-channel serial digital form for use by a drum-type facsimile machine when operated in the receiver mode as described in connection with FIGS. 2 and 3. The circuitry for providing the desired multiplexing and demultiplexing includes a clock generator 46, shift registers 61-64, a buffer memory 56, a read only memory 58, an interface adapter 60, and a programmed microprocessor 65. Delay shift registers 72 and 74, a delay oscillator 71 and power amplifiers 81-84 are also shown in FIG. 4 which provides the proper level and time of application of demultiplexed signals to the printing styli 41-44 from the shift registers 61-64, respectively.

The clock generator 46 includes an oscillator 47, a counter 48 and a decoder 49. The counter 48 is connected via conductor 86 to receive a line start pulse once each revolution of the drum 12 from a sensor (not shown), a portion of which is carried by the drum. The sensor is positioned so the pulse is provided as the leading edge of the image bearing sheet 12 or copy sheet has reached a desired point relative to the scan head 14. The line start pulse serves to reset the counter 48 to zero when the pulse is present and allows the counter to count pulses from the oscillator 47 when the pulse is not present. The counted pulses from the oscillator 47 are also supplied as clock pulses to each of the shift registers 61-64. During the print (receive) mode the clock pulses control the exit of serial data from each shift register and the entry of serial data into each shift register during the scan (transmit) mode. The number of pulses that are provided by the oscillator 47 for each revolution of the drum determines the copy resolution in the direction of drum rotation. For example, based on a drum diameter of 70.26 mm, operating at 6 revolutions per second, a frequency of 10,644 cps will meet the CCITT Group III standard of 1728 dots in 215 mm for a digital facsimile machine. When the desired count is reached, for example, 1728, the decoder 49 provides a signal to the oscillator 47 to stop its operation. When the next line start pulse is received, the counter 48 is reset to zero terminating the stop signal supplied by the decoder to the oscillator to allow another set of timing clock pulses to be supplied by the oscillator until it is again stopped when the desired number of timing pulses have been supplied.

Each of the shift registers 61-64 is operable as a serial input-parallel output shift register during the scan (transmit) mode and as a parallel input-serial output shift register during the print (receive) mode. In addition to being connected for receiving clock signals from the clock generator 46, the shift registers 61-64 are operatively connected to the read only memory 58 and the programmed microprocessor 65 to operate under the control of the programmed microprocessor and scan and print programs stored in the read only memory 58. Control signals are supplied from the microprocessor 65 to the shift registers 61-64 via connections represented by conductors 91-94, respectively, which connect to the microprocessor via connections represented by the bus 95 and the conductor 96. Address signals are supplied from the microprocessor 65 to the shift registers 61-64 via connections represented by address conductors 101-104, respectively, which connect to the microprocessor via the connections represented by bus 105 and conductor 106. The flow of data signals to and from the shift registers 61-64 to a data bus 115 is via connections represented by data conductors 111-114, respectively. The data bus 115 connects to the microprocessor 65 via connections represented by the conductor 116. Operation of the microprocessor 65 requires the presence of a power up signal which is supplied via conductor 25 from a power supply (not shown) for the circuitry.

The interface adapter 60 connections to the control bus 95, the address bus 105 and the data bus 115 are represented by conductors 97, 107 and 117, respectively. An interface adapter suitable for use is available under the type designation R6532. The interface adapter serves to allow the main data control program stored in the read only memory 58 to interface with the rest of the circuitry in accordance with the mode of operation of the machine. The interface adapter 60 is connected to receive the line start pulses via conductor 86 for control purposes and receives a signal via conductor 50 when the scan (transmit) mode of operation for the machine has been selected and the communications with the receiving machine that are needed prior to transmission have been completed. The interface adapter also receives a signal via conductor 80 when the print (receive) mode of operation has been selected and the needed communications with the transmitting machine prior to transmission have been completed. A serial clock signal supplied from the digital modem (not shown) for the machine is received by the interface adapter 60 via conductor 70. The serial clock signals serve to determine when data is transferred to the machine's transmitter (not shown) or transferred from the machine's receiver (not shown). Serial data is supplied to and flows from the interface adapter 60 to the machine's digital modem logic via connections represented by conductor 98.

A conductor 100 is also connected to the interface adapter 60 for transmitting a subscan on signal to the subscan motor control 20 (FIG. 1) when required by the scan data program and print data program stored in the read only memory 58 to provide proper synchronization between the movement of the scan head and data flow for the scan mode and between the movement of the printing stylus assembly and data flow for the print mode of operation. The subscan on signal is removed when it is required that the subscan be stopped.

are available. Each line start pulse provided on line 86 initiates the printing of four new lines if they are available.

More detailed operation of the circuitry when the scan (transmit) mode is selected will be considered first before considering the remainder of the circuitry of FIG. 4. When a power up signal is received via conductor 25, control of the operation of the circuitry is via the microprocessor 65 and the main data control program (FIGS. 5 and 6) in the read only memory 58. A scan signal on line 50 received at the interface adapter 60 serves to initiate use of the scan portion (FIG. 6) of the main data control program to set the shift registers 61-64 for receiving serial data from comparators 51-54, respectively, and to initialize the two sections of the buffer memory 56 to establish the condition for cBOD=cEOD=cBOM and dEOD=dBOD=dBOM. The scan data portion of the program (FIG. 7) is then entered. Assuming a line pulse is present, the clock generator 46 begins to provide the clock pulses required during a revolution of the drum which are provided to the shift registers 61-64. Initiation of the operation of the clock generator 46 is independent of any program in the read only memory 58. With a line pulse presented via interface adapter 60, the scan data program provides for a determination as to whether there is room for four lines of data in the decompressed data section of the buffer. If there is room, the scan program changes the dBOD pointer to a new dBOD equal to the old dBOD plus 3 LEN. A check is also made to determine whether the dBOD is then greater than the dEOM. If dBOD is not greater, a subscan on signal is provided to the subscan motor control of FIG. 2 via the interface adapter 60 and conductor 100. If dBOD is determined to be greater than dEOM, a new dBOD is made equal to the dBOD minus the dEOM minus 1 plus the dBOM with a subscan on signal then provided. With the subscan movement initiated, the scan head will be moved axially of the drum by the subscan motor drive 18 (FIG. 2) as the image bearing document 13 is presented to the light to electric transducer assembly 26 at the scan head for the generation of digitized signals from the comparators 51-54 for presentment to the shift registers 61-64.

Figure 7:
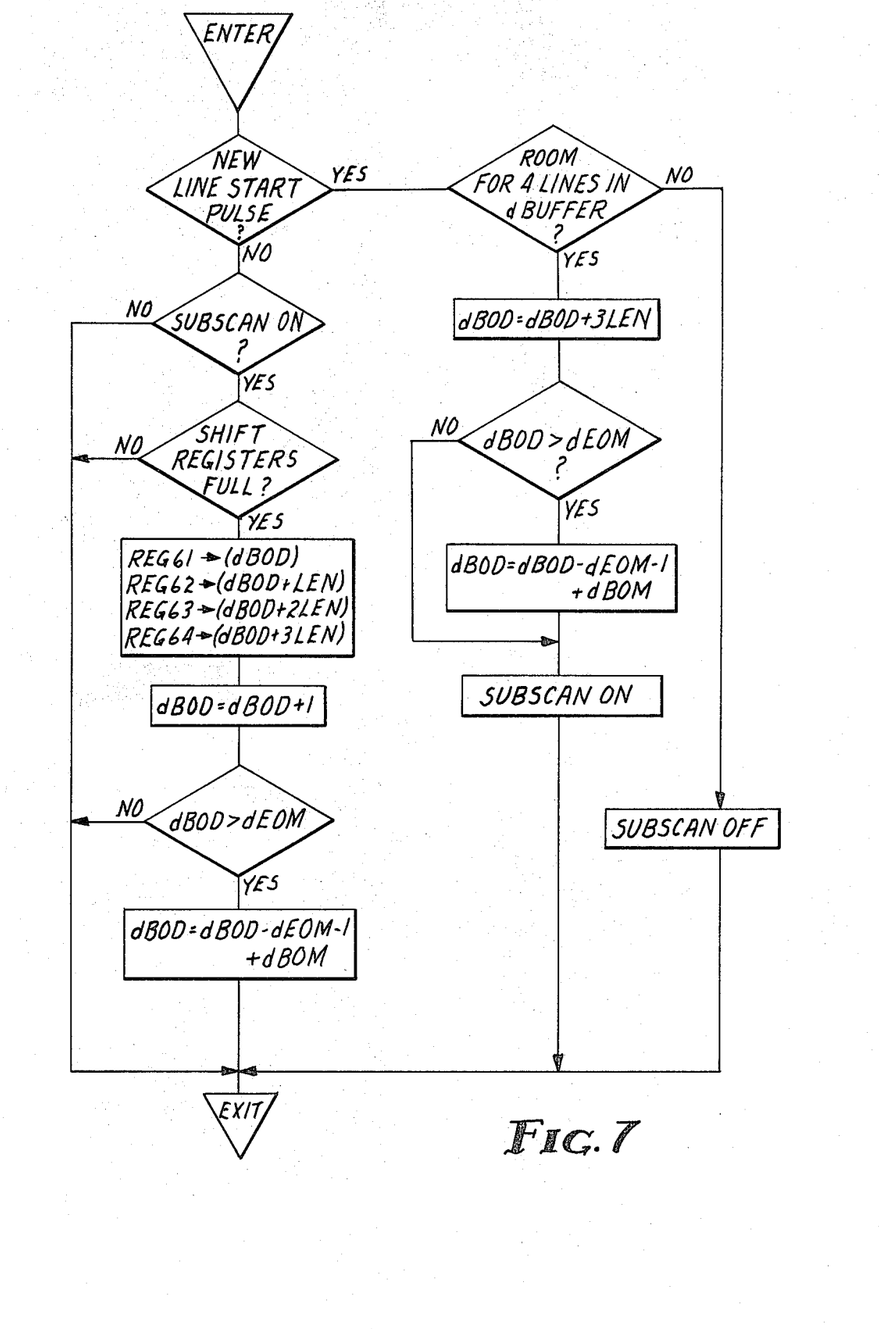

Upon initiation of the subscan on condition, the scan data program is exited and the compress data program portion (FIG. 8) comes into play. The compress data program checks for a full line in the decompress section of the buffer memory. The compress data routine is immediately exited since a full line would not be present in the decompressed section of the buffer memory at this time causing the transmit data program (FIG. 9) to be entered. The program looks for a new clock signal at conductor 70 to the interface adapter 60. A new clock signal would not be found present at this time. This being the case, the transmit data routine is immediately exited. If a new clock signal were at the interface adapter 60 via conductor 70, the program determines whether the compress portion of the buffer memory is empty. If empty, the transmit data routine is exited after storing a zero byte (8 data bits) at the interface adapter. Return is made to the scan data program (FIG. 7). The program requires that a determination be made as to whether a new line start pulse is present. One will not be present at this time. With a determination then made that the subscan is on, the shift registers 61-64 are checked to see if they are full. The shift registers 61-64 are filled with data signals from comparators 51-54, respectively, in response to eight pulses produced by the clock generator 46. Assuming they are full, the byte (8 bits) provided at each register is entered at separately addressed byte positions in the decompressed section of the buffer memory 56.

The byte at register 61 is placed at the dBOD; the byte at register 62 at dBOD plus LEN; the byte at 63 at dBOD+2LEN and the byte at register 64 at dBOD plus 3LEN. A determination is then made as to whether the dBOD is greater than dEOM. If not greater, the scan data routine is exited. If greater, the dBOM is made equal to dBOM minus dEOM minus one byte plus dBOM and the scan data routine exited. The compress data routine (FIG. 8) is entered as indicated previously, followed by the transmit data routine with return to the scan data routine. The process just described is repeated until a sufficient number of bytes for a full line of data for each shift register is stored in the decompress section of the buffer. Upon the next entry into the compress data routine, the requirement of at least one full line of data in the decompress section of the buffer is met causing the dEOD line to be addressed and its data compressed to provide N compressed bytes, where N is dependent on the compression routine and the data that was present in the decompressed line. Assuming there is room in the compress section of the buffer, the compressed line is stored in the buffer at cBOD. The compressed data program then provides for a new cBOD by the addition of N bytes. A check is made to determine if cBOD is greater than cEOM. If so, the cBOD is made equal to cBOD minus cEOM minus one byte plus cBOM. A new dEOD is then established, as would be the case if cBOD had been found not to be greater than cEOM, by adding one LEN to the old dEOD. The new dEOD is then checked to see if it is greater than dEOM. If not, the compress data routine is exited and the transmit data routine entered. If so, a new dEOD equal to dEOD minus dEOM minus one byte plus dBOM is established and the compress data routine exited and the transmit data routine entered.

Referring then to the transmit data routine (FIG. 9) and assuming a clock pulse is not presented from the machine modem logic (not shown) to the interface adapter 60 via conductor 70, the compress section of the buffer is checked to determine if it is empty. Since it is not empty, the program causes the byte at cEOD to be stored at the interface adapter ready to be read out by the digital modem (not shown) that is used with the facsimile machine. The transmit data routine then establishes a new cEOD by adding one byte. The routine then checks to determine whether cEOD is greater than cEOM. If cEOD is not greater, the transmit data routine is exited. If cEOD is greater, a new cEOD is established that is equal to cEOD minus cEOM minus one+cBOM and the routine exited. The scan data, compress data and transmit data programs are then repeated.

There will be times where the transmission of data can not keep up with the storage of the data in the buffer memory. For this reason the scan data program requires that the decompress section of the buffer be checked to determine whether there is room for four lines of data when a new line start pulse is present. As indicated by the flow diagram for the scan data portion of the program (FIG. 7), a subscan off signal will be produced and supplied via the interface adapter 60 to the subscan motor control 20 in FIG. 2 if there is not room for four lines of data in the decompress section. The scan data routine is then exited and the scan head will therefore be stopped and there is no transfer of data from the shift registers 61-64 until enough data has been moved out of the decompressor section to provide the required four lines of room in the decompress section of the buffer memory.

Before considering the receive (print) mode of operation per the flow diagram, consideration must be given to the remainder of the circuitry of FIG. 4 that has not been discussed. As has been mentioned, the shift registers 61-64 are used during the receive mode of operation and are arranged so each can receive 8 bits of information in parallel from different addresses in the decompress section of the buffer 56 which are then serially presented at the serial output for each shift register in response to clock pulses provided by the clock generator 46. The serial bits provided from a shift register are amplified to provide a voltage to the associated stylus of sufficient magnitude to provide a reaction at the copy paper 13 on the drum 10 when the bit from the shift register is a logic "1" representing a black area to be produced at the copy paper with no voltage being produced when a logic "0" bit is provided by the shift register.

The styli 41-44 are staggered as shown in FIG. 3 with such staggering also represented in FIG. 4 with the arrow 11 indicating the direction of drum rotation. As mentioned earlier, staggering of the styli is used in order to provide good electrical isolation between the styli. It can be seen that it is necessary that a signal from shift registers 62 and 64 to be amplified for application to styli 42 and 44, respectively, be delayed for a time sufficient to allow the proper portion of the copy paper on the drum to reach the styli 42 and 44. The delay needed is dependent on the drum speed and circumference such that: $D=PS/C$ where D is the delay needed, S is the stylus offset spacing, P is the drum period for one revolution and C is the drum circumference. The delay for styli 42 and 44 can, for example, be provided by shift registers 72 and 74, respectively, driven by a common oscillator 71. Calculating the time delay (D) as indicated above and using shift registers 72 and 74, each having the same number of bits (n), the frequency of the oscillator 71 required can be determined from the relationship $f=n/D$, where D is the delay, n is the number of bits for the shift register and f is the oscillator frequency.

Power amplifiers 81-84 are provided for the signals from shift registers 61-64, respectively, with the shift register 72 connected between shift register 62 and amplifier 82 and the shift register 74 connected between shift register 64 and amplifier 84.

A more detailed description of the operation of the circuitry when the facsimile machine is used in the print (receive) mode follows. As in the scan mode, the main data control program (FIG. 5) provides for monitoring of the interface adapter 60 and upon detection of a print signal at conductor 80 from the machine modem logic (not shown), the two sections of the buffer memory 56 are initialized to establish the condition for cBOD=cEOD=cBOM and dEOD=dBOD=dBOM and the shift registers 61-64 are set for parallel/serial operation for receiving data bytes from the decompress section 56d of the buffer memory. The receive data routine (FIG. 12) is entered and if a serial clock pulse from the modem logic (not shown) is presented at the conductor 70 of the interface adapter 60, the data byte from the modem (not shown) entered in the interface adapter 60 is stored in the compressed data section 56c of the buffer 56 at cDOB. A new cBOD is established by adding one byte to the old cBOD after which a determination is made as to whether cBOD is greater than cEOM. If cBOD is not greater, the receiver data routine is exited. If greater, cBOD is made equal to cBOD minus cEOM minus 1 plus cBOM and the routine is then exited.

The decompress data program portion (FIG. 11) is then entered and is immediately exited to the print data program (FIG. 12) if the decompress section 56d of buffer 56 does not have room for one line, or if there is room for one line in the decompress section, but a line of data is not available in the compress section 56c. Upon start up of the print mode of operation, there would be room in the decompress section of the buffer, but the compress section would not have a line of data. According to the main data control flow diagram (FIG. 6), the print data program routine (FIG. 10) is entered when the decompress routine is exited.

Figure 10:
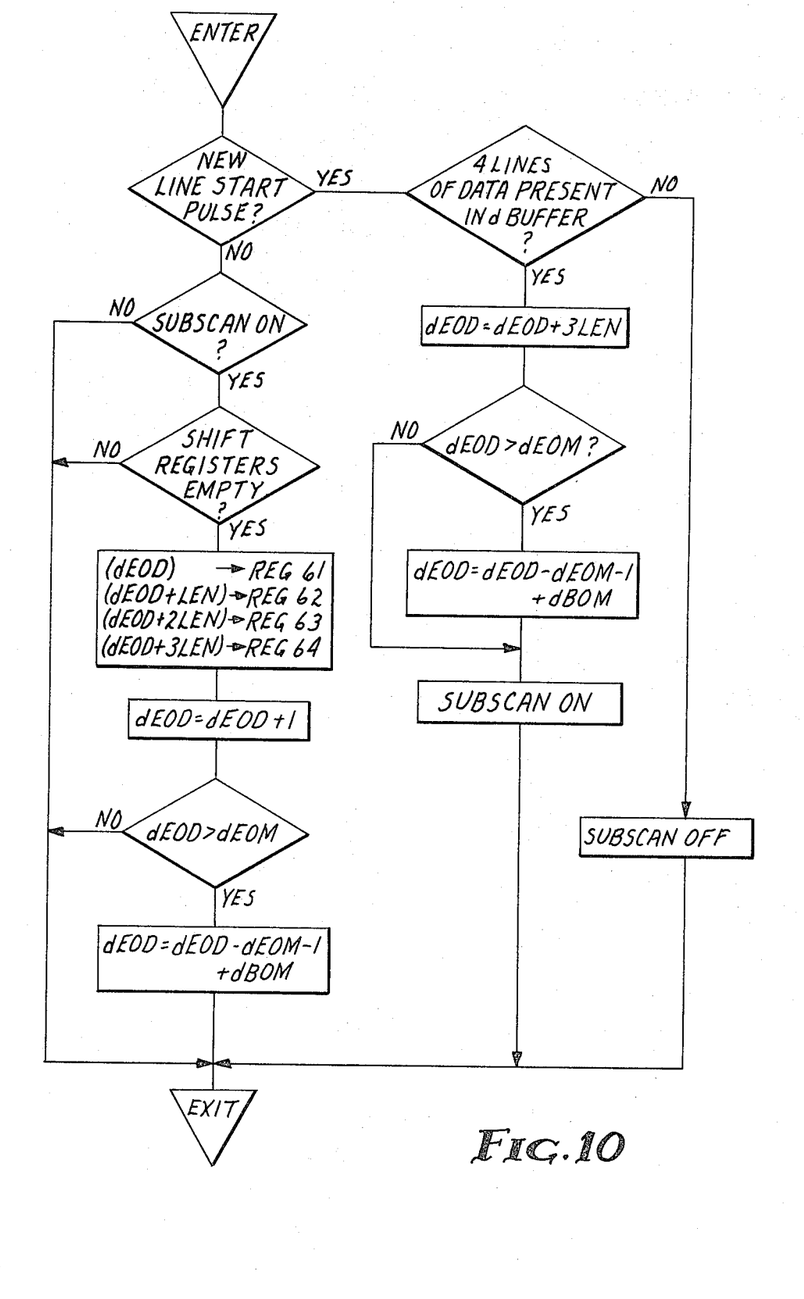

The print data program per the flow diagram of FIG. 10 provides for a determination as to whether a line start pulse is present. Assuming a line start pulse is present a determination is made as to whether there are four lines of data in the decompress section 56d of the memory buffer. Since one full line hasn't even been received at this point, the answer is no, causing a subscan off action to be taken by termination of the subscan on signal that was presented to the subscan motor control 20 (FIG. 2) via the interface adapter 60 and conductor 100. This terminates movement of the print head axially of the drum 10.

The print data routine is exited with the receive, decompress and print routine, as has been described, being repeated until one line of data is present in the compressed data buffer. When this has occurred, the decompress data routine (FIG. 11) decompresses the line starting at cEOD. The decompressed line is then stored in the decompressed data section 56d of the buffer starting at dBOD. Each time a line is stored in the decompressed data section, a new cEOD is established equal to the old cEOD plus N bytes for a compressed line. A determination is then made as to whether a cEOD is greater than cEOM. If greater, a new cEOD is established equal to the prior cEOD minus cEOM minus 1 plus cBOM before a new dBOD equal to the old dBOD plus one LEN is established. The new dBOD is checked to determine whether it is greater than dEOM before the decompress data routine is exited. If greater, a new dBOD equal to the old dBOD minus dEOM minus one plus dBOM is established and the decompress data routine exited and the print data routine (FIG. 10) entered. The print data routine is immediately exited since four lines are not in the decompressed data section of the buffer at this time. The subscan off condition remains unchanged.

As additional bytes are received a point will be reached when the print data routine is entered and four data lines are found to be present in the decompressed data section of the buffer following the presentment of a new line start pulse on conductor 86. In this case, the print data routine establishes a new dEOD by adding three LEN to the old dEOD with a determination then made as to whether the dEOD is greater than dEOM. If dEOD is not greater than dEOM the subscan on signal is provided. Otherwise, a new dEOD is established using the prior dEOD minus dEOM minus one byte plus dBOM with the subscan on signal then provided. The print data routine is exited with the receive and decompress routines repeated. The print data routine is again entered when the decompress routine is exited and with a new line start pulse not present and the subscan on a determination is made as to whether the shift registers 61-64 are empty, i.e., can they each receive a byte from each of four different data lines. If they can't, the routine is exited. If the shift registers are empty, a byte at dEOD; dEOD+LEN; dEOD+2LEN and dEOD+3LEN is entered into shift registers 61-64, respectively, from the decompressed data section of the memory 56. A new dEOD is established equal to the old dEOD plus one byte. A determination is then made as to whether dEOD is greater than dEOM. If it is not greater, the routine is exited and the receive data routine entered. If dEOD is greater than dEOM, a new dEOD is established that is equal to dEOD minus dEOM minus one plus dBOM and the print data routine exited and the receive mode entered if the system is still in the print mode.

The next eight clock pulses provided by the oscillator 47 of clock generator 46 to the shift registers 61-64 are effective to remove the bits from each shift register in the order they were presented in the byte that was received from the memory 56. The serial output from each of the shift registers 61-64 is amplified before being applied to a stylus. If a bit is a logic 1, the signal provided to a stylus for such bit is at a voltage level sufficient to cause a mark to be produced at the copy paper 13 that is carried on the drum 10. As indicated earlier, the output from shift registers 62 and 64 is delayed by shift registers 72 and 74, respectively, which are controlled by the oscillator 71, so that any marking signal provided to styli 42 and 44 will be provided at the time drum has moved the distance necessary so any mark to be produced at styli 42 and 44 will be in line with any produced by styli 41 and 43 by the last signals supplied to styli 41 and 43.

The receive data, decompress data and print data routines as described are repeated to produce an image on the copy paper 13 in accordance with the data provided to the interface adapter 60 via the serial data conductor 98. When the print mode signal at conductor 80 is found to be absent at the time the print data routine is exited, the main data control routine causes the microprocessor 65 to look for a scan or print mode signal to be presented to the interface adapter 60 for such time as a power up signal is presented to the microprocessor at conductor 25.

There will be times when the data signals have not been received fast enough. This is the reason the print program routine provides for a check for the presence of four lines of data in the decompress section of the buffer when a new line start pulse is received. As indicated by the flow diagram of FIG. 11 for the print data program, the subscan for the print head is terminated if four lines of data is not present in the decompress section of the buffer memory. Axial movement of the print stylus assembly 36 will therefore be stopped and the print data routine exited with the receive data and decompress data routines repeated until there are four lines of data present in the decompress section of the buffer to again cause a subscan on signal to be provided to the subscan motor control to again move the print stylus assembly 36 axially of the drum 10.

While the shift registers 61-64 are indicated to be of a type such as those available under the type designation MC 6852, that can be set to provide serial input/parallel output or a parallel input/serial output, it can be appreciated by those skilled in the art that an equivalent operation is obtained by the use of two shift registers for each of the shift registers 61-64, one to provide serial input/parallel output for the scan mode of operation and another to provide parallel input/serial output for the print mode of operation.

While the foregoing embodiment of the invention shows the use of a plurality of light-to-electric transducers for a scan operation with a like member of printing styli, it will be apparent that such equality is not essential. The use of a number of printing styli that is different than the number of light-to-electric transducers is considered to be within the teachings of the invention that has been presented. While such an arrangement requires the operation as set forth in the flow diagrams of FIGS. 5-12, to be altered, such alterations will be apparent to and can be readily made by those of ordinary skill in the art.

What is claimed is:

1. A transceiver facsimile machine of the drum-type operable in a scan mode or print mode wherein the drum is rotatable while a scan/print head is moved axially of the drum to provide a scan action when in the scan mode and a print action when in the print mode including:
   a plurality of shift register means operable for providing serial/parallel operation for a scan mode of operation and operable for providing parallel/serial operation for a print mode of operation;
   a plurality of printing styli carried by the scan/print head each operatively connected to a different one of said shift register means for receiving serial data from said shift register means during the print mode;
   scanning means including a plurality of light-to-electric transducers carried by the scan/print head, each operatively connected to a different one of said shift register means for serial entry of data signals from said light-to-electric transducers to a different one of said shift register means during the scan mode;
   a buffer memory operatively connected to each of said shift registers for receiving data signals from each of said shift registers in parallel during a scan mode of operation and for receiving serial data signals and providing data signals in parallel to each of said shift registers during a print mode of operation;
   a memory for storing programs for a microprocessor; and
   a microprocessor operatively connected to said memory, said plurality of shift register means, and said buffer memory for operatively controlling movement of data signals from said plurality of shift means into said buffer memory for each scan revolution of the drum during a scan mode of operation and operatively controlling the entry of serial data signals into said buffer memory and movement of data signals from said buffer memory to said plurality of shift register means for each print revolution of the drum during a print mode of operation.

2. A transceiver facsimile machine according to claim 1 wherein said printing styli are staggered, said transceiver facsimile machine further including a delay means and a series connected amplifier combination, one for every other one of said printing styli and its associated one of said plurality of shift register means for operatively connecting each of said last mentioned printing styli and its associated shift register means; and an amplifier, one for each of the remaining printing styli and its associated one of said plurality of shift register means for operatively connecting each of said last mentioned printing styli and its associated shift register means.

3. A transceiver facsimile machine according to claim 1 wherein said scanning means includes a amplifier and comparator combination for each of said light-to-electric transducers for digitizing the output of each of said light-to-electric transducers.

4. A transceiver facsimile machine according to claim 1 and further including a clock generator operatively connected to each shift register means of said plurality of shift register means for providing a fixed number of clock pulses for each revolution of the drum for timing the entry of data signals from said light-to-electric transducers into said plurality of shift registers during a scan mode of operation and for timing the removal of data signals from said plurality of shift registers during a print mode of operation.

5. A transceiver facsimile machine according to claim 1 wherein said microprocessor and said memory serve to compress data signals entered into said buffer memory for each scan revolution of the drum during a scan mode of operation and serve to decompress serial data signals entered into said buffer memory during a print mode of operation.

* * * * *

UNITED STATES PATENT AND TRADEMARK OFFICE
CERTIFICATE OF CORRECTION

PATENT NO. : 4,366,509

DATED : December 28, 1982

INVENTOR(S) : DONALD L. NORRELL, KURT H. PETERSON & RONALD F. SCHMID

It is certified that error appears in the above—identified patent and that said Letters Patent is hereby corrected as shown below:

Column 1, line 57, change "scan-" to -- scan/- --.

Column 4, line 45, change "of" to -- in --.

Column 11, line 68, change "cDOB" to -- cBOD --.

Signed and Sealed this

Fifteenth Day of March 1983

[SEAL]

Attest:

GERALD J. MOSSINGHOFF

Attesting Officer

Commissioner of Patents and Trademarks